United States Patent
Magerkurth et al.

(10) Patent No.: US 8,255,261 B2
(45) Date of Patent: Aug. 28, 2012

(54) DYNAMIC, PRIVACY-AWARE WORKFORCE ASSIGNMENT

(75) Inventors: Carsten Magerkurth, St. Gallen (CH); Holger Ridinger, Zurich (CH); Ali Dada, St. Gallen (CH); Felix Graf von Reischach, Zurich (CH)

(73) Assignee: SAP AG, Walldorf (DE)

( * ) Notice: Subject to any disclaimer, the term of this patent is extended or adjusted under 35 U.S.C. 154(b) by 88 days.

(21) Appl. No.: 12/832,604

(22) Filed: Jul. 8, 2010

(65) Prior Publication Data

US 2012/0010914 A1    Jan. 12, 2012

(51) Int. Cl.
*G06Q 10/00* (2006.01)

(52) U.S. Cl. ............... 705/7.25; 705/7.11; 705/7.12; 705/7.13; 705/7.17

(58) Field of Classification Search ......... 705/7.11–7.42
See application file for complete search history.

(56) References Cited

U.S. PATENT DOCUMENTS

| | | | | |
|---|---|---|---|---|
| 7,791,495 | B1* | 9/2010 | Green et al. | 340/686.6 |
| 7,894,987 | B1* | 2/2011 | Tester et al. | 701/526 |
| 2007/0027806 | A1* | 2/2007 | Sands et al. | 705/42 |
| 2008/0164998 | A1* | 7/2008 | Scherpbier et al. | 340/539.13 |
| 2009/0089149 | A1* | 4/2009 | Lerner et al. | 705/10 |
| 2009/0204434 | A1* | 8/2009 | Breazeale, Jr. | 705/3 |

OTHER PUBLICATIONS

A. Smith; H. Balakrishnan; M. Goraczko; and N. Priyantha, "Tracking moving devices with the cricket location system." In Proceedings of the 2nd international Conference on Mobile Systems, Applications, and Services (Boston, MA, USA, Jun. 6-9, 2004). MobiSys '04. ACM, New York, NY, 190-202.*

C. Chien; W. Chen; and S. Hsu, "An indirect workforce (re)allocation model for semiconductor manufacturing." In Proceedings of the 40th Conference on Winter Simulation (Miami, Florida, Dec. 7-10, 2008). S. Mason, R. Hill, L. Winch, and O. Rose, Eds. Winter Simulation Conference. Winter Simulation Conference, 2201-2208.

D.H. Nguyen; A. Kobsa; and G. Hayes, "An empirical investigation of concerns of everyday tracking and recording technologies." In Proceedings of the 10th international Conference on Ubiquitous Computing (Seoul, Korea, Sep. 21-24, 2008). UbiComp '08, vol. 344. ACM, New York, NY, 182-191.

A. Hopper; A. Harter; and T. Blackie, "The active badge system (abstract)." In Proceedings of the INTERACT '93 and CHI '93 Conference on Human Factors in Computing Systems (Amsterdam, The Netherlands, Apr. 24-29, 1993). CHI '93. ACM, New York, NY, 533-534.

* cited by examiner

*Primary Examiner* — Jason Dunham
*Assistant Examiner* — Richard Scheunemann
(74) *Attorney, Agent, or Firm* — Fountainhead Law Group P.C.

(57) ABSTRACT

In one embodiment, a method includes receiving a first activity map. A first mobile client determines first positioning information based on a first position of the first mobile client. The first mobile client generates a second activity map using the first positioning information of the first mobile client as a damping factor for activity in the first activity map. The first mobile client sends the second activity map to a balancing manager. A third activity map is received from the balancing manager. The third activity map is based on the second activity map from the first mobile client and a second activity map from a second mobile client. The second activity map from the second mobile client is generated using second positioning information for a second position of the second mobile client as the damping factor.

20 Claims, 7 Drawing Sheets

DYNAMIC, PRIVACY-AWARE WORKFORCE ASSIGNMENT

BACKGROUND

Particular embodiments generally relate to dynamic processing of activity maps, and more specifically to dynamic workforce assignment.

In retail environments, optimal distribution of store employees with respect to the distribution of customers is desired. A retailer would like to have employees available in areas of a store in which the amount of customers is most concentrated at a given point in time. If employees are not available to help customers, the customers may start searching for employees or leave the store. This may negatively impact sales for the retailer and also negatively impact the perception of the retailer. However, having more employees in higher traffic areas may lead to a higher turnover of customers being served within a timeframe and also potentially more customers being attracted to the store in the long term based on the positive perception of existing customers.

In some jurisdictions, privacy of employees is protected. For example, tracking of employees is prohibited by law in some countries and raises ethical issues. Thus, the position of employees cannot be tracked and used to assign them to different areas of the store in those jurisdictions. In this case, an employee may not be able to transmit his/her position coordinates in the store where someone other than the employee is aware of the position of employee in the store.

SUMMARY

In one embodiment, a method includes receiving a first activity map. A first mobile client determines first positioning information based on a first position of the first mobile client. The first mobile client generates a second activity map using the first positioning information of the first mobile client as a damping factor for activity in the first activity map.

The first mobile client sends the second activity map to a balancing manager. A third activity map is received from the balancing manager. The third activity map is based on the second activity map from the first mobile client and a second activity map from a second mobile client. The second activity map from the second mobile client is generated using second positioning information for a second position of the second mobile client as the damping factor.

In one embodiment, generating the second activity map for the first mobile client includes reducing an amount of activity within an area based on the first positioning information of the first mobile client.

In one embodiment, the first positioning information determined by the first mobile client is not sent to the balancing manager.

In one embodiment, the third activity map is outputted on the first mobile client.

In another embodiment, a method includes receiving a plurality of second activity maps determined from a first activity map from a plurality of mobile clients. Each second activity map is an altered version of the first activity map that is generated using positioning information for a position of a mobile client in the plurality of mobile clients as a damping factor. A computing device generates a third activity map using the plurality of second activity maps. The third activity map is sent to the plurality of mobile clients.

In one embodiment, the computing device does not receive the first activity map.

In one embodiment, the computing device does not receive the positioning information used by each of the mobile clients to alter the first activity map.

In another embodiment, a system includes an activity map generator configured to generate a first activity map based on activity information. The system further includes a plurality of mobile clients. Each mobile client is configured to receive the first activity map from the activity map generator, determine positioning information for the mobile client, and generate a second activity map from the first activity map. Each second activity map is an altered version of the first activity map that is generated using positioning information of a mobile client in the plurality of mobile clients as a damping factor. The system also includes a balancing manager configured to: receive the second activity map from each of the plurality of mobile clients, generate a third activity map using the second activity map from each of the plurality of mobile clients, and send the third activity map to the plurality of mobile clients.

In one embodiment, the system includes a plurality of activity sensors configured to measure activity information. The plurality of activity sensors send the activity information to the activity map generator.

The following detailed description and accompanying drawings provide a better understanding of the nature and advantages of the present invention.

DETAILED DESCRIPTION

Described herein are techniques for a dynamic workforce assignment system. In the following description, for purposes of explanation, numerous examples and specific details are set forth in order to provide a thorough understanding of embodiments of the present invention. Particular embodiments as defined by the claims may include some or all of the features in these examples alone or in combination with other features described below, and may further include modifications and equivalents of the features and concepts described herein.

Figure 1:
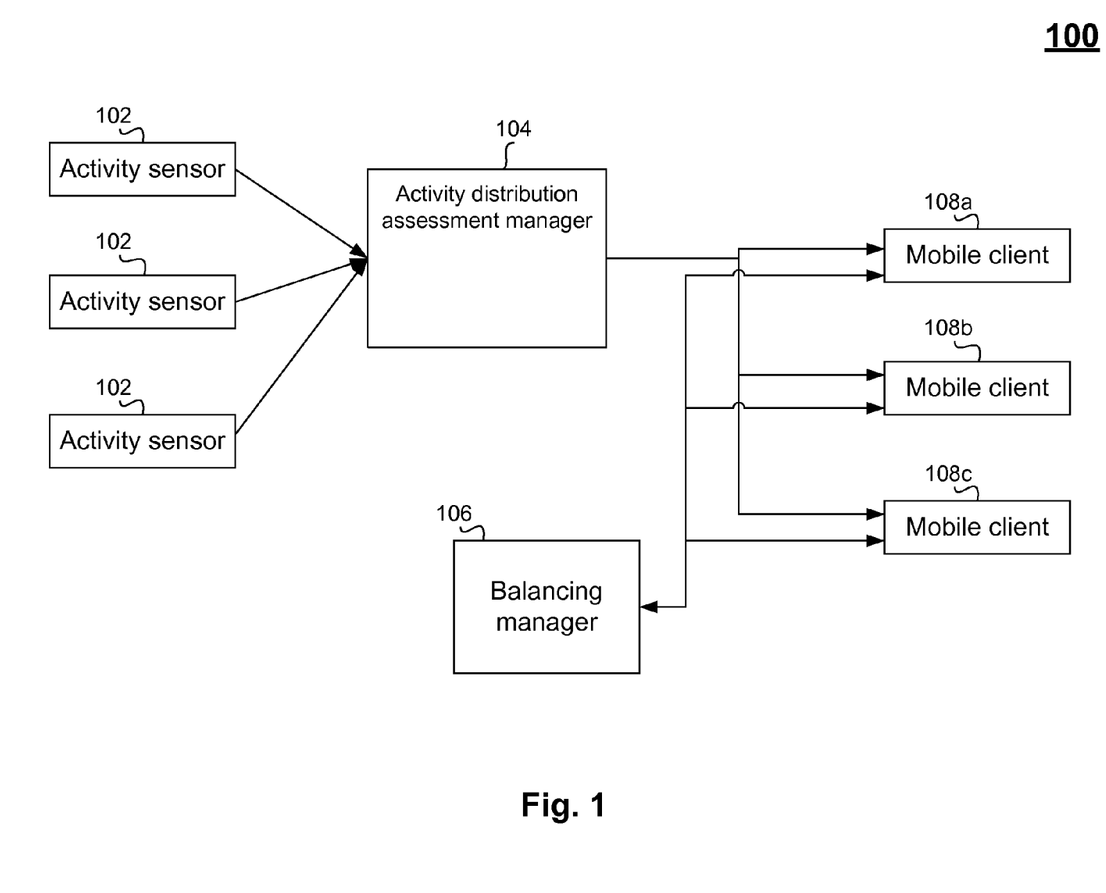
FIG. 1 depicts a system for providing dynamic workforce assignment according to one embodiment.

FIG. 1 depicts a system 100 for providing dynamic workforce assignment according to one embodiment. System 100 includes activity sensors 102, an activity distribution assessment manager 104, a balancing manager 106, and mobile clients 108*a*-108*c*. System 100 may be used for a store, which may be an area in which activity may be monitored. In one example, the store may be a retail store that includes customers where the store is owned and operated by a company. Employees of the company work in the store and provide customer service to the customers. Although retail is discussed, particular embodiments may be used in other areas where activity is monitored.

Activity sensors 102 may be devices that gather information about an amount of activity in the store. In one embodiment, the amount of activity measured is proportional to a number of users (e.g., customers or employees) that are in different areas of the store. For example, an area with more customers has a higher activity measurement than an area with fewer customers.

In one embodiment, activity sensors 102 may be pressure sensors located in the floor area of the store. The pressure sensors measure activity due to the pressure of users walking throughout the store. Using pressure sensors would preserve the privacy of any users as images of the users are not taken.

In another embodiment, surveillance cameras may be used to measure the activity of the store. Surveillance cameras may be present in most retail stores for security purposes and can also be used to measure the overall activity in the store. Software may be used to measure the amount of activity, such as facial or other body part recognition may measure the number of users captured on the surveillance cameras.

Other activity sensors 102 may also be used to assess the amount of activity in the store. For example, any methods that can provide a measurement of activity in different areas of the store may be used.

Activity sensors 102 deliver activity information about the amount of activity in a different area of the store to an activity distribution assessment manager 104. Activity distribution assessment manager 104 determines a raw activity map. The raw activity map interprets the activity information from activity sensors 102 and shows differences in the amount of activity in different areas of the store.

Mobile clients 108 may be any computing device that may be associated with an employee. Mobile clients 108 include cellular phones, personal digital assistants (PDAs), tablet computers, or other mobile computing devices. An employee may personally carry a mobile client 108. Mobile clients 108 can include a positioning system that allows each mobile client 108 to determine positioning information of a position of each mobile client 108. For example, a global positioning system (GPS) may be used to determine position coordinates of mobile device 108. Additionally, positioning information may include other information, such as the time the position coordinates were determined.

Mobile clients 108 receive the raw activity map from activity distribution assessment manager 104. Particular embodiments allow each mobile client 108 to alter the raw activity map based on the positioning information of each mobile client 108. For example, the altered activity map may reduce the activity amount at a position of mobile client 108. In one example, the position of mobile client 108 may be used as a damping factor for the activity amount at that position. The damping factor may be a factor of reduction that is determined. This process will be described in more detail below. The altered activity maps are then sent to balancing manager 106.

Balancing manager 106 then generates an aggregated activity map using the altered activity maps from multiple mobile clients 108. The aggregated activity map may be generated based on an aggregation function. For example, an average of the activity in the altered activity maps is used to generate the aggregated activity map.

The privacy of the position of mobile clients 108 may be protected because balancing manager 106 does not know the position of mobile clients 108. Rather, balancing manager 106 receives altered activity maps that contain data of activity in the store. Position coordinates of mobile clients 108 are not stored in the altered activity map or sent to balancing manager 106. Particular embodiments allow mobile clients 108 to know their position, but other entities in system 100 do not know the exact position of each mobile client 108.

Balancing manager 106 then sends the aggregated activity map to each mobile client 108. Employees using mobile clients 108 can then use the aggregated activity map to determine where to position themselves in the store. For example, the aggregated activity map may be displayed and viewed by the employee. The employee may then identify areas with high activity and move to those areas in the store. Other ways of interpreting the aggregated activity map will be discussed below and include auditory outputs.

Figure 2:
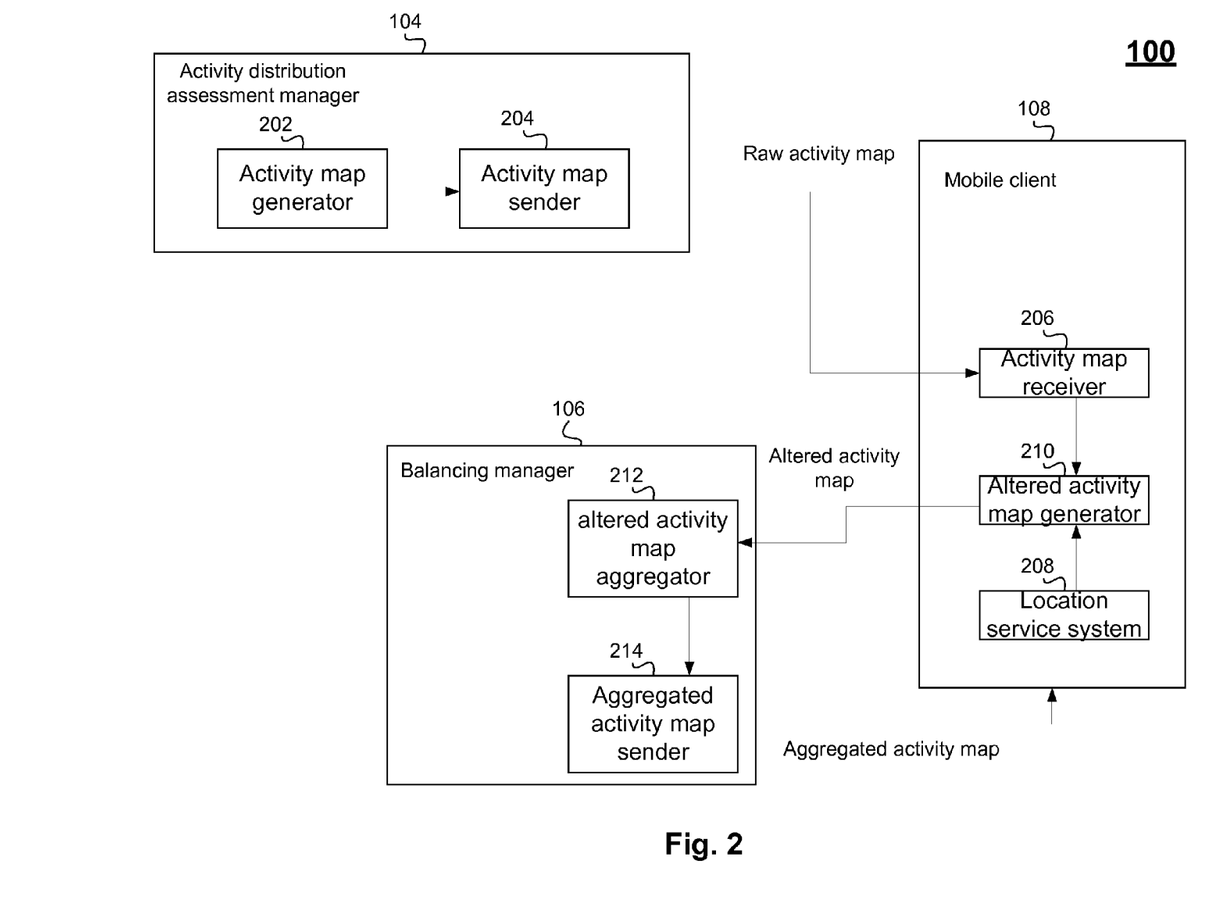
FIG. 2 depicts a more detailed example of the system according to one embodiment.

System 100 will now be described in more detail. FIG. 2 depicts a more detailed example of system 100 according to one embodiment. At activity distribution assessment manager 104, an activity map generator 202 receives activity information from activity sensors 102. Activity map generator 202 integrates the information from all activity sensors 102 and generates the raw activity map. The raw activity map may be a distribution that is calculated by relating the raw activity data to each other so that relative measurement values can be obtained that are scaled and variant. That is, different values of activity are related to each other such that comparisons of different levels of activity can be determined. Different methods of calculating the raw activity map may be used.

An activity map sender 204 then sends the raw activity map to mobile client 108. Although not shown, the raw activity map is sent to multiple mobile clients 108. In one embodiment, activity map sender 204 does not send the raw activity map to balancing manager 106. As will be discussed below, not sending the raw activity map to balancing manager 106 protects the privacy of mobile clients 108 when the altered activity maps are received at balancing manager 106.

At mobile client 108a, an activity map receiver 206 receives the raw activity map from activity map sender 204. The raw activity map may not be displayed by mobile client 108. Rather, the aggregated activity map that will be generated by balancing manager 106 will be displayed at a later time.

Location service system 208 then determines positioning information for mobile client 108. Although location service system 208 is shown as being inside mobile client 108, components used to determine the positioning information may be distributed outside of mobile client 108. For example, a device may determine (in conjunction with mobile client 108) positioning information of mobile client 108 and send the positioning information to location service system 208.

The positioning information may include location coordinates or other positioning information (e.g., time) for mobile client 108. The positioning information may be locally used by mobile client 108 to alter the raw activity map. For example, an altered activity map generator 210 uses the positioning information to alter the raw activity map received from activity distribution assessment manager 104. In altering the raw activity map, relative activity at the position of mobile client 108 is reduced. For example, the reduction may be by a certain configurable factor in a certain configurable radius around the position of mobile client 108. The configurable factor may be a percentage reduction of raw activity in the area around mobile client 108. Thus, the position of mobile client 108 is used as a damping factor to reduce the amount of activity in the area. By reducing the activity in the area in the altered activity map, this will act as a reduced incentive for other employees to move into this area if there is less activity. Altered activity map generator 210 sends the altered map to balancing manager 106.

At balancing manager 106, an altered activity map aggregator 212 receives each altered activity map from mobile client 108 (the receiving of multiple altered activity maps from multiple mobile clients 108 is not shown). The aggregated activity map may then be generated using the altered activity maps. For example, altered activity map aggregator 212 uses an aggregation function that averages all of the altered activity maps. Other aggregation functions may also be used to generate the altered activity map.

Altered activity map aggregator 212 does not know which area has been dampened because balancing manager 106 may not receive the raw activity map that was sent to mobile clients 108. For example, activity distribution assessment manager 104 may be segregated from balancing manager 106 in that communication of the raw activity map from activity distribution assessment manager 104 to balancing manager 106 is not performed. Activity distribution assessment manager 104 and balancing manager 106 may be separate processes operating on the same or different computing devices. However, in either case, the raw activity map may not be communicated to balancing manager 106. In this case, a comparison of the altered activity map with the raw activity map cannot be performed to determine where the dampening of activity occurred. Accordingly, mobile clients 108 do not need to report their positions directly, but perform local calculations using the positioning information on the raw activity map. The positioning information is not sent to balancing manager 106.

In one embodiment, the altered activity maps received by balancing manager 106 do not include identification information for mobile clients 108 that sent the altered activity maps. Thus, balancing manager 106 can identify reductions in activity, but cannot identify the positioning of mobile clients 108.

Aggregated activity map sender 214 then sends the aggregated map to mobile client 108 (and other mobile clients—not shown).

Figure 3:
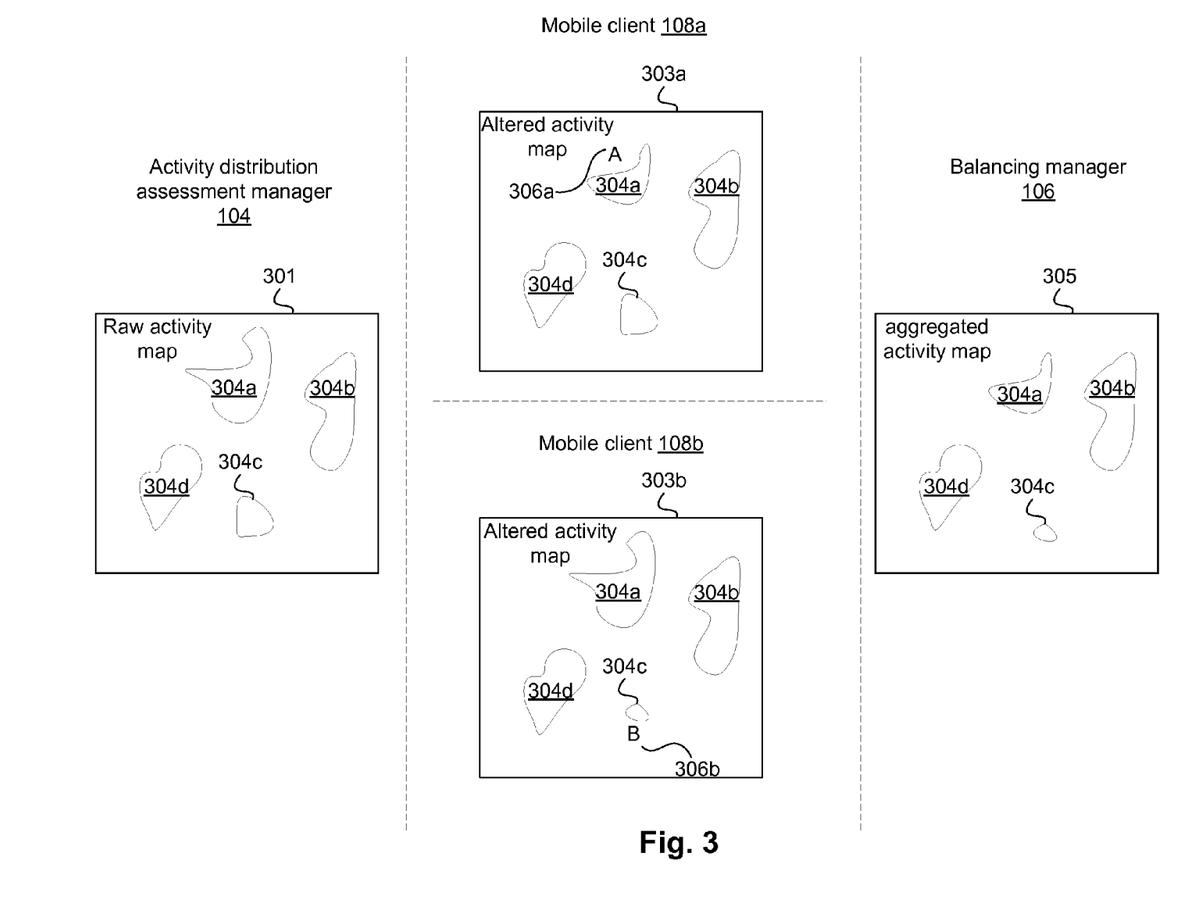
FIG. 3 depicts an example of activity maps used throughout the above process according to one embodiment.

FIG. 3 depicts an example of activity maps used throughout the above process according to one embodiment. The activity maps shown may be conceptual activity maps. That is, the activity maps are used for illustrative and discussion purposes and may not actually be displayed by mobile clients 108.

At 301, a raw activity map includes areas of activity at 304a-304d. These activities may be highlighted by shading, coloring, or other methods. For this example, a larger shape represents more activity, but other methods may be provided to express different levels of activity.

Mobile client 108a and mobile client 108b both receive the same raw activity map. At 303a, an altered activity map for mobile 108a is shown and at 303b, an altered activity map for mobile client 108b is shown. The position of mobile client 108a is shown at 306a with the letter "A" and the position of mobile client 108b is shown at 306b with the letter "B". Because altered activity maps are not displayed, the position is shown for illustrative purposes.

For mobile client 108a, the raw activity map has been altered at 304a where the activity is reduced. For mobile client 108b, the raw activity map has been altered at 304c where the activity is reduced. The altered activity maps at mobile clients 108a and 108b are different because of the different positioning of each mobile client 108a and 108b. For example, the activity at 304a has been reduced in the altered activity map for mobile client 108a while the activity at 304c remains the same, and the activity at 304c has been reduced in the altered activity map for mobile client 108b while the activity at 304a remains the same. Both altered activity maps are sent to balancing manager 106.

Balancing manger 106 aggregates the altered activity maps into an aggregated activity map shown at 305. As shown, the activity at 304a and 304c has been reduced in the aggregated activity map. The reduced activity in both of these areas indicates that there is less need for an employee to move to that area. The aggregated activity map is then sent to both mobile clients 108a and 108b. Because the aggregated activity map includes activity that has been dampened where other employees are, a more accurate view of where to move may be provided. For example, if an employee is located in an area of the store, activity in that area has been dampened. Thus, there is less of a chance that another employee will move to that area. However, areas where no employees are located and have a high activity will not have been dampened and an employee may move to that area.

As will be described below, different ways of outputting the aggregated activity maps are provided. Using the aggregated activity maps, employees for both mobile clients 108a and 108b can then determine that the areas of highest activity are 304a, 304b, and 304d. The employees can choose any of those areas to move to in the store. For example, the employee for mobile client 108a can determine that there is still activity in his/her present area and can choose to stay in this area. The employee for mobile client 108b may determine that there is very little activity in his/her area and may move to areas 304b or 304d. The employee for mobile client 108b may not move to the area where mobile client 108a is because that activity at 304a has been reduced due to the presence of the employee for mobile client 108a being there.

Figure 4:
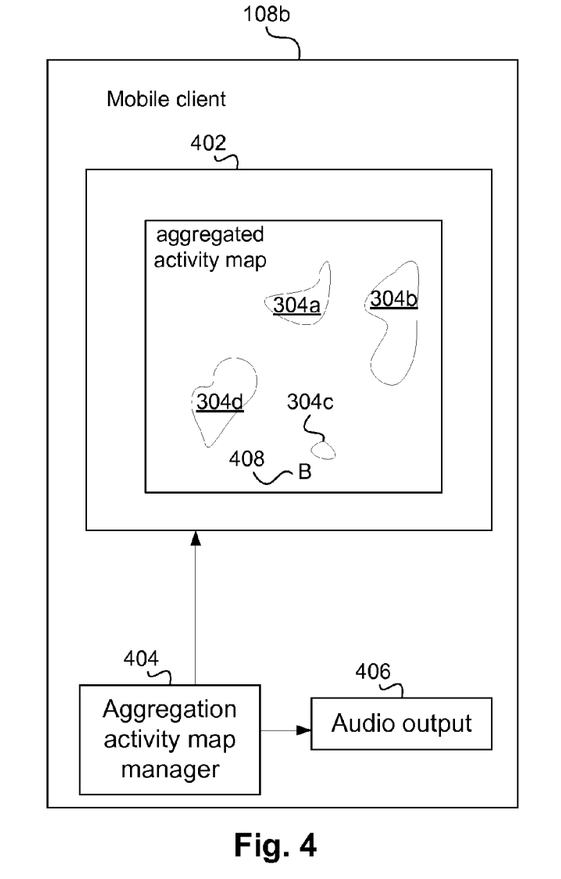
FIG. 4 depicts a more detailed example of a mobile client according to one embodiment.

Different methods of outputting the aggregated activity map are provided and can be used by an employee to determine where to move to in the store. FIG. 4 depicts a more detailed example of mobile client 108 according to one embodiment. In one example, aggregation activity map manager 404 may display the aggregated activity map on a display 402. Display 402 may show a map that includes information on which areas of the store include the most activity. Additionally, a position of mobile client 108 may be included on the aggregated activity map, which is shown as a "B" at 408. The positions of other mobile clients 108 are not included on the aggregated activity map of this mobile client 108. Rather, reduced activity is shown, which keeps the positions of other mobile clients 108 private as an employee only knows the levels of activity in a store and not positions of other employees.

The employee using mobile client 108 can then view the aggregated activity map and decide which area to move to in the store. In one example, the employee may see from the aggregated activity map that they are in an area with low activity. The employee may then select an area in the store that has higher activity and move to that area. Also, if an employee is already located in an area with high activity, the employee may choose to stay in that area. Each employee is free to determine on their own which area to move to. That is, balancing manager 106 may not provide instructions on where to move to each mobile client 108. This is because balancing manager 106 does not know the exact position of mobile clients 108. Only mobile clients 108 know their own position.

In addition to displaying the aggregated activity map, other output methods may be used. For example, auditory information may be output to indicate to an employee that he/she should search for a new area. For example, an activity map manager 404 may analyze the aggregated activity map and the position of mobile client 108 and determine if the employee should move to a new area. If the employee should move to a new area, an alert may be output through audio output 406.

In one example, a threshold value may be used to determine whether an alert should be output. Activity map manager 404 measures a delta (e.g., difference) of the activity at the mobile client's current position with a maximum activity amount found at another position on the aggregated activity map. When the delta reaches the threshold value, activity map manger 404 then outputs the alert through audio output 406. This signals to the employee that he/she should search for a new location. The alert may be output until the condition ends, i.e., the delta between the activity at the current position and the maximum activity is below the threshold. This may provide alternative ways of alerting employees where mobile clients 108 do not include display technology.

Figure 5:
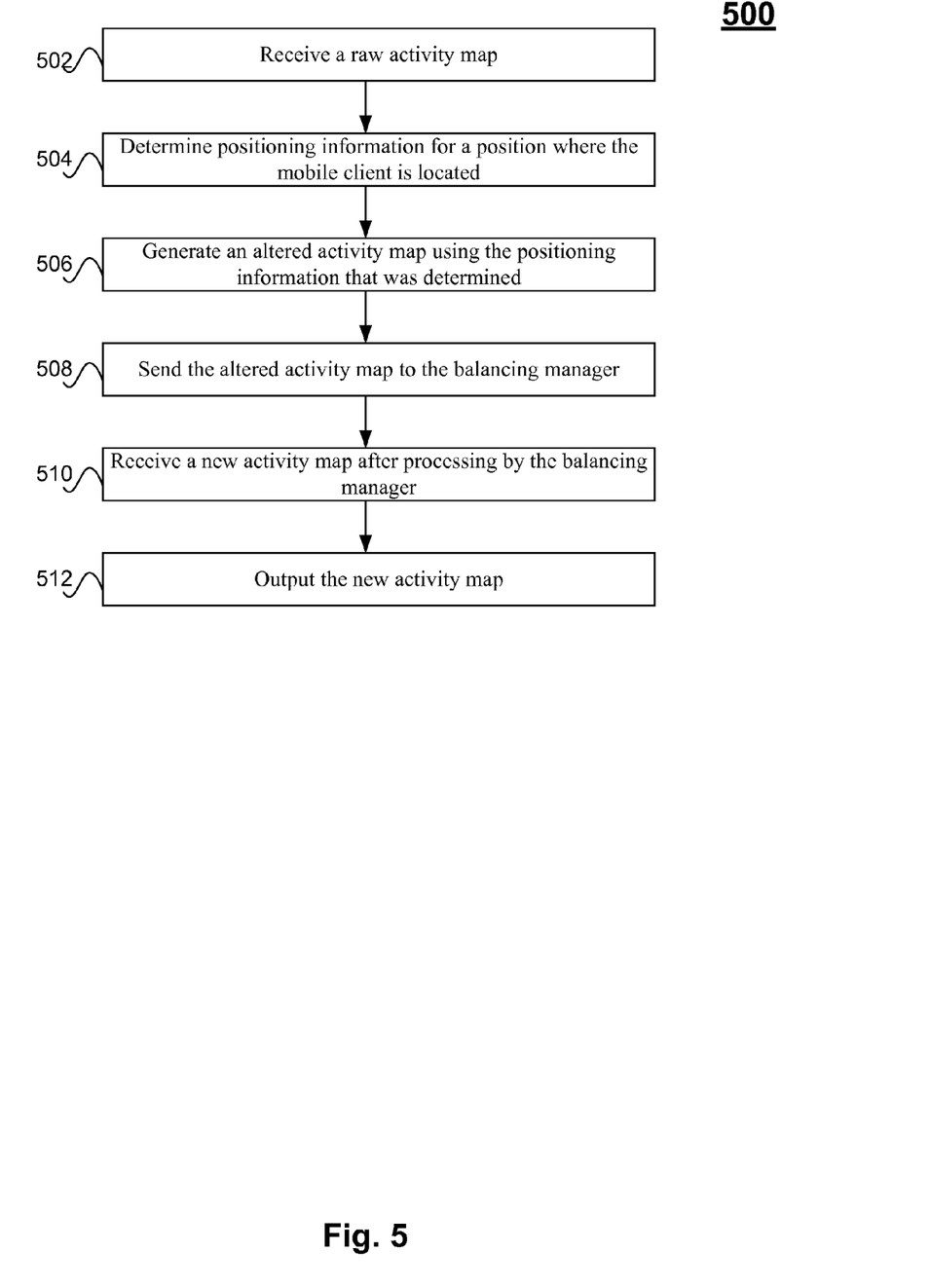
FIG. 5 depicts a method for processing raw activity maps at the mobile client according to one embodiment.

Methods to perform the different aspects of particular embodiments will now be described. FIG. 5 depicts a method for processing raw activity maps at mobile client 108 according to one embodiment. At 502, mobile client 108 receives a raw activity map from activity assessment manager 104. At 504, mobile client 108 determines positioning information for a position where it is located.

At 506, mobile client 108 generates an altered activity map using the positioning information that was determined. As described above, the position may be used as a damping factor to reduce the activity in the raw activity map.

At 508, mobile client 108 sends the altered activity map to balancing manager 106. At 510, after processing by balancing manager 106, an aggregated activity map is received. The aggregated activity map is based on altered activity maps from multiple mobile clients 108.

At 512, mobile client 108 may output the aggregated activity map. As discussed above, the aggregated activity map may be displayed. Also, other alerts using the aggregated activity map may be used.

Figure 6:
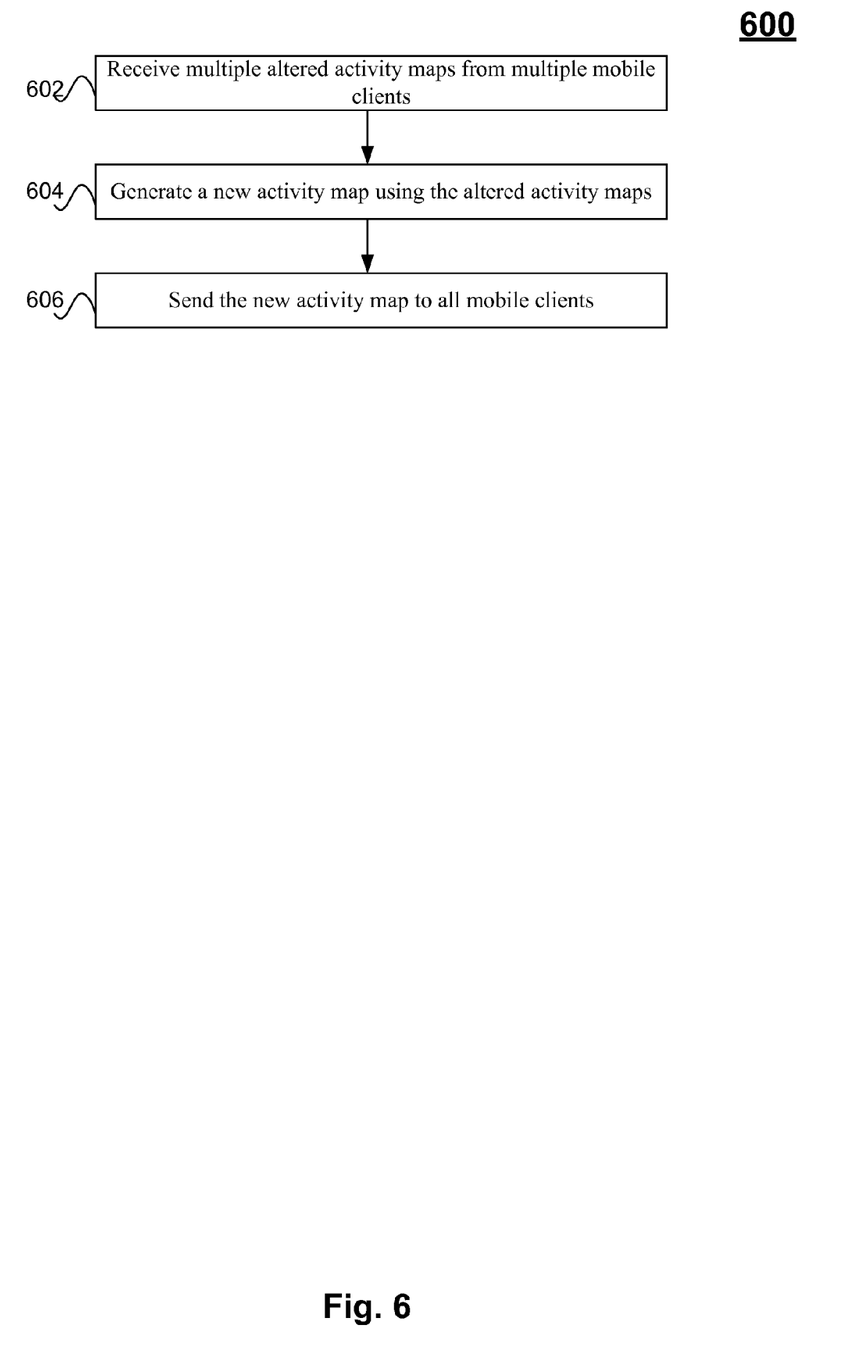
FIG. 6 depicts a method for processing altered activity maps at a balancing manager according to one embodiment.

FIG. 6 depicts a method for processing altered activity maps at balancing manager 106 according to one embodiment. At 602, balancing manager 106 receives multiple altered activity maps from multiple mobile clients 108. Each altered activity map is an altered version of a raw activity map. Each mobile client 108 used its own position as a damping factor to reduce the activity in the raw activity map to generate the altered version.

At 604, an aggregated activity map is generated using the altered activity maps. For example, an aggregation function may be used to generate the aggregated activity map. At 606, the aggregated activity map is sent to all mobile clients 108.

Particular embodiments provide many advantages. For example, employees may be dynamically alerted to changing amounts of customer activity in the store. The above process may be repeated as new raw activity data is received, new altered activity maps are generated, and new aggregated activity maps are sent to mobile clients 108. This continuous process dynamically allows employees to move to areas where activity is the highest in the store.

Also, particular embodiments protect the privacy of employees. Mobile clients 108 only know their exact position and their exact position may not transmitted to other entities in system 100. Activity maps with reduced activity in certain areas are used to generate an accurate aggregated activity map that optimizes where areas in the store have the highest activity and the need for employees to move to those areas. Employees are then allowed to make their own decisions as to which areas to move to in the store.

Figure 7:
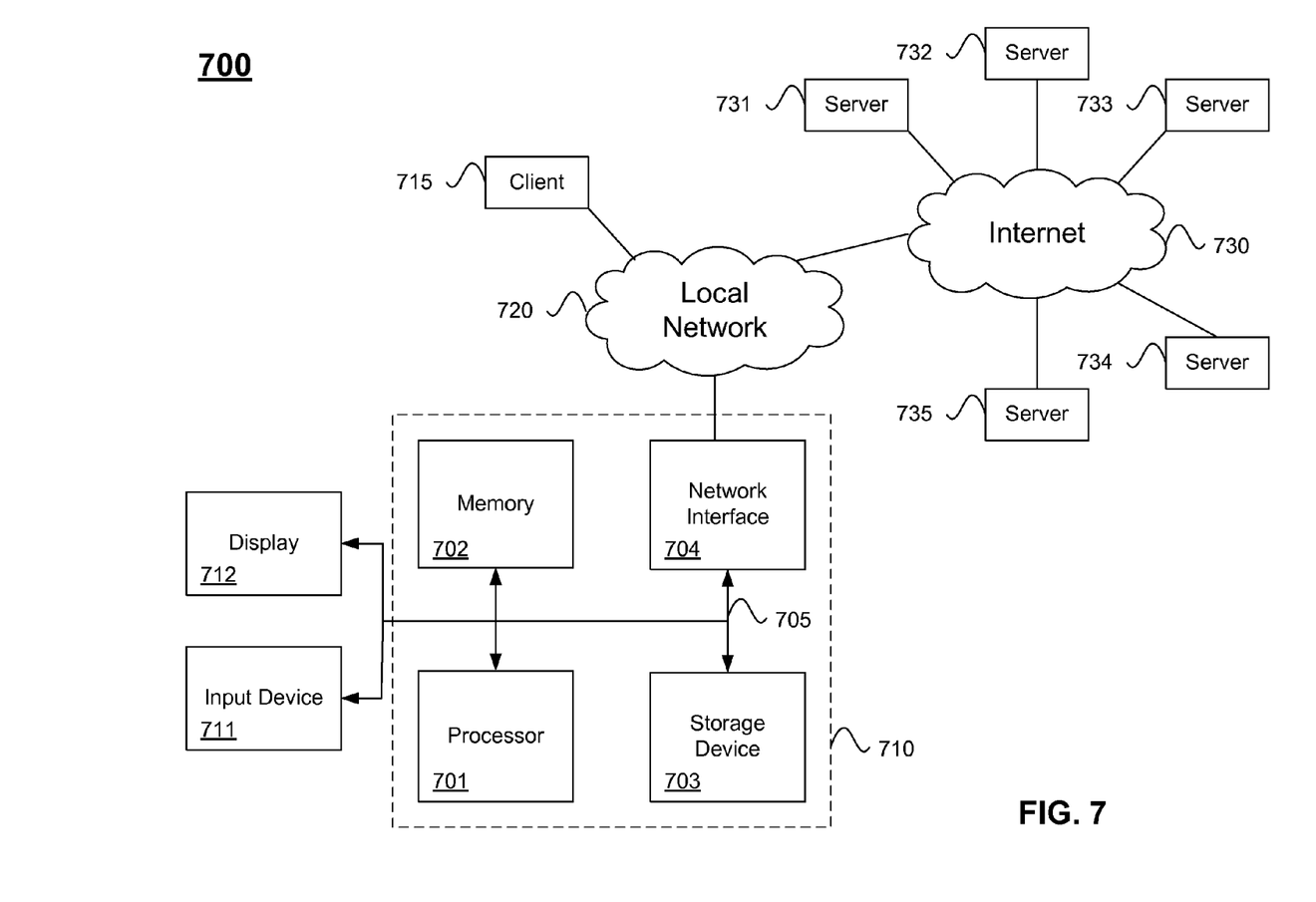
FIG. 7 illustrates hardware of a special purpose computing machine configured with a dynamic workforce assignment system according to one embodiment.

FIG. 7 illustrates hardware of a special purpose computing machine configured with a dynamic workforce assignment system according to one embodiment. An example computer system 710 is illustrated in FIG. 7. Computer system 710 includes a bus 705 or other communication mechanism for communicating information, and a processor 701 coupled with bus 705 for processing information. Computer system 710 also includes a memory 702 coupled to bus 705 for storing information and instructions to be executed by processor 701, including information and instructions for performing the techniques described above, for example. This memory may also be used for storing variables or other intermediate information during execution of instructions to be executed by processor 701. Possible implementations of this memory may be, but are not limited to, random access memory (RAM), read only memory (ROM), or both. A storage device 703 is also provided for storing information and instructions. Common forms of storage devices include, for example, a hard drive, a magnetic disk, an optical disk, a CD-ROM, a DVD, a flash memory, a USB memory card, or any other medium from which a computer can read. Storage device 703 may include source code, binary code, or software files for performing the techniques above, for example. Storage device and memory are both examples of computer readable storage mediums.

Computer system 710 may be coupled via bus 705 to a display 712, such as a cathode ray tube (CRT) or liquid crystal display (LCD), for displaying information to a computer user. An input device 711 such as a keyboard and/or mouse is coupled to bus 705 for communicating information and command selections from the user to processor 701. The combination of these components allows the user to communicate with the system. In some systems, bus 705 may be divided into multiple specialized buses.

Computer system 710 also includes a network interface 704 coupled with bus 705. Network interface 704 may provide two-way data communication between computer system 710 and the local network 720. The network interface 704 may be a digital subscriber line (DSL) or a modem to provide data communication connection over a telephone line, for example. Another example of the network interface is a local area network (LAN) card to provide a data communication connection to a compatible LAN. Wireless links are another example. In any such implementation, network interface 704 sends and receives electrical, electromagnetic, or optical signals that carry digital data streams representing various types of information.

Computer system 710 can send and receive information through the network interface 704 across a local network 720, an Intranet, or the Internet 730. For a local network, computer system 710 may communicate with a plurality of other computer machines, such as server 715. In the Internet example, software components or services may reside on multiple different computer systems 710 or servers 731-735 across the network. The processes described above may be implemented on one or more servers, for example. A server 731 may transmit actions or messages from one component, through Internet 730, local network 720, and network interface 704 to a component on computer system 710. The software components and processes described above for the dynamic workforce assignment system may be implemented on any computer system and send and/or receive information across a network, for example.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

The above description illustrates various embodiments of the present invention along with examples of how aspects of the present invention may be implemented. The above examples and embodiments should not be deemed to be the only embodiments, and are presented to illustrate the flexibility and advantages of the present invention as defined by the following claims. Based on the above disclosure and the following claims, other arrangements, embodiments, implementations and equivalents may be employed without departing from the scope of the invention as defined by the claims.

What is claimed is:

1. A method comprising:
receiving, at a first mobile client, a first activity map;
determining first positioning information based on a first position of the first mobile client;
determining a damping factor based on the first positioning information of the first mobile client;
generating, by the first mobile client, a second activity map by reducing an amount of activity in a first area of the first activity map based on the damping factor;
sending, from the first mobile client, the second activity map to a balancing manager; and
receiving a third activity map from the balancing manager, the third activity map based on the second activity map from the first mobile client and a second activity map from a second mobile client, the second activity map from the second mobile client generated by reducing the amount of activity in a second area of the first activity map based on a second damping factor.

2. The method of claim 1, wherein generating the second activity map for the first mobile client comprises reducing an amount of activity based on the damping factor within an area based on the first positioning information of the first mobile client.

3. The method of claim 1, wherein the third activity map is generated using an aggregation function that is applied to the second activity map for the first mobile client and the second activity map for the second mobile client.

4. The method of claim 1, wherein the third activity map is different from the first activity map and the second activity map.

5. The method of claim 1, wherein the first positioning information determined by the first mobile client is not sent to the balancing manager.

6. The method of claim 1, further comprising outputting the third activity map on the first mobile client.

7. The method of claim 6, wherein the first activity map and the second activity map are not outputted on the first mobile client.

8. The method of claim 6, wherein outputting comprises displaying the third activity map on the first mobile client.

9. The method of claim 6, wherein outputting comprises outputting an audible sound based on the third activity map if it is determined that a user of the mobile client should move to another position.

10. The method of claim 9, further comprising:
determining a threshold;
determining a delta value between activity at a current position of the first mobile client and another position in the third activity map; and
outputting the audible sound when the delta value passes the threshold.

11. A method comprising:
receiving, at a balancing manager from a plurality of mobile clients, a plurality of second activity maps determined from a first activity map, each second activity map being an altered version of the first activity map that is generated by one of the plurality of mobile clients by reducing the amount of activity in an area in the first activity map based on a damping factor;
generating, by a computing device, a third activity map using the plurality of second activity maps; and
sending the third activity map to the plurality of mobile clients.

12. The method of claim 11, wherein generating the third activity map comprises applying an aggregation function to the plurality of second activity maps.

13. The method of claim 12, wherein the aggregation function comprises an averaging function configured to average the plurality of second activity maps.

14. The method of claim 11, wherein the computing device does not receive the first activity map.

15. The method of claim 11, wherein the computing device does not receive the positioning information used by each of the mobile clients to alter the first activity map.

16. A system comprising a balancing manager configured to:
receive, from a plurality of mobile clients, a plurality of second activity maps determined from a first activity map, each second activity map being an altered version of the first activity map is generated by reducing the amount of activity in an area in the first activity map based on a damping factor;
generate a third activity map using the plurality of second activity maps; and
send the third activity map to the plurality of mobile clients.

17. The system of claim 16, further comprising an activity map generator configured to generate the first activity map based on activity information, wherein the activity map generator does not send the first activity map to the balancing manager.

18. The system of claim 17, further comprising a plurality of activity sensors configured to measure the activity information, the plurality of activity sensors sending the activity information to the activity map generator.

19. The system of claim 17, further comprising the plurality of mobile clients, each mobile client configured to:
receive the first activity map from the activity map generator;
determine the positioning information for the mobile client; and
generate the second activity map from the first activity map.

20. The system of claim 19, wherein the positioning information used by each of the mobile clients to alter the first activity map is not received at the balancing manager.

* * * * *